United States Patent
Hsu (10) Patent No.: US 7,511,245 B2
(45) Date of Patent: Mar. 31, 2009

(54) STUD WELDING APPARATUS WITH COMPOSITE CABLE

(75) Inventor: Chris Hsu, Mentor, OH (US)

(73) Assignee: Nelson Stud Welding, Inc., Elyria, OH (US)

( * ) Notice: Subject to any disclaimer, the term of this patent is extended or adjusted under 35 U.S.C. 154(b) by 0 days.

(21) Appl. No.: 11/224,513

(22) Filed: Sep. 12, 2005

(65) Prior Publication Data

US 2007/0056934 A1    Mar. 15, 2007

(51) Int. Cl.
*B23K 9/20*    (2006.01)

(52) U.S. Cl. ........................................ 219/98

(58) Field of Classification Search ............... 219/98, 219/99; 174/68.1
See application file for complete search history.

(56) References Cited

U.S. PATENT DOCUMENTS

| | | | |
|---|---|---|---|
| 2,760,041 A * | 8/1956 | Yonkers | 219/90 |
| 3,800,064 A | 3/1974 | Lusk | |
| 3,809,849 A | 5/1974 | Spisak | 219/98 |
| 3,984,653 A * | 10/1976 | Blaas et al. | 219/98 |
| 3,992,565 A | 11/1976 | Gatfield | 174/15 |
| 4,384,944 A | 5/1983 | Silver et al. | |
| 4,423,306 A | 12/1983 | Fox | 219/137.9 |
| 4,594,495 A | 6/1986 | Glorioso | 219/98 |
| 4,682,850 A | 7/1987 | White et al. | |
| 5,491,321 A | 2/1996 | Stuart et al. | 219/137.61 |
| 5,902,150 A | 5/1999 | Sigl et al. | 439/587 |
| 5,960,144 A | 9/1999 | Klumps et al. | |
| 6,175,094 B1 | 1/2001 | Easterday | |
| 6,193,548 B1 | 2/2001 | Sigl et al. | 439/550 |
| 6,236,789 B1 | 5/2001 | Fitz | |
| 6,350,947 B1 | 2/2002 | Bertini et al. | |
| 6,476,339 B2 | 11/2002 | Easterday | 219/99 |
| 6,559,385 B1 | 5/2003 | Johnson et al. | |
| 6,644,602 B1 | 11/2003 | Lundstrom et al. | 248/51 |
| 6,747,246 B2 | 6/2004 | Crandell, III | |
| 6,797,923 B2 | 9/2004 | Delgado et al. | 219/137.63 |
| 6,815,641 B2 | 11/2004 | Doherty | 219/137.31 |
| 2004/0037634 A1 | 2/2004 | Muller et al. | 403/345 |
| 2006/0106444 A1* | 5/2006 | Michael et al. | 607/122 |

* cited by examiner

*Primary Examiner*—Kevin P Kerns
(74) *Attorney, Agent, or Firm*—Gifford, Krass, Sprinkle, Anderson & Citkowski, P.C.

(57) ABSTRACT

A stud welding apparatus includes a power supply and a stud welding tool having a welding head portion and a cable receiving portion. A composite cable having first and second ends is coupled at a first end to the stud welding tool at the cable receiving portion and to the power supply at the second end of the composite cable. If the stud feeder is present, the second end of the composite cable can be coupled to the stud feeder. The composite cable includes a conductor having no individual electrical isolation and at least one control lead electrically isolated from the conductor. The conductor and the at least one control lead are surrounded by an outer non-conductive layer.

28 Claims, 8 Drawing Sheets

STUD WELDING APPARATUS WITH COMPOSITE CABLE

FIELD OF THE INVENTION

The invention relates to a stud welding apparatus, and more particularly to a stud welding apparatus having a composite cable.

BACKGROUND OF THE INVENTION

Typical stud welding apparatus of the prior art include a stud welding gun having separate cables for supplying a welding current, electrical control signals, and other functions such as a gas conduit for supplying inert welding gas, pressure tubes for pneumatic controls, and tubes for feeding studs. Such prior art welding apparatus include the separate cables that are usually taped or otherwise bundled together with a thin sheath in a "cable package". The bundled cables are inherently difficult to handle and manipulate and are prone to damage when used in a typical work environment where the cables are moved and exposed to hostile welding conditions with chafe, bend, twist, cut, heat, fire, welding spatter, stretch, whip, tear, wear and abrasion.

Additionally, a control cable associated with the bundle is typically much weaker than the larger welding current cable due to its smaller diameter and thinner jacket. As such, the control cable is subject to a shorter service life when exposed to the same wear and abrasion. Additionally, the end connectors for a control cable are also weaker than the connector for the welding current cable such that when an operator pulls or otherwise manipulates a cable the control cable is subject to failure due to the weaker connector. Furthermore, in a cable package for robotic applications, the control cable is typically run straight along side the power cable and air tubes. Rapid movement of the weld head exerts inordinate torsion and bending. The straight control cable does not contain slack to absorb the stretch and compression, causing pre-mature fatigue failure and loss of conductivity. Prior art cables that include a polyester gas conduit are typically not protected and are subject to collapse, melting or puncture. Downtime associated with unexpected cable failures can be very costly to a manufacturer.

There is therefore a need in the art for a stud welding apparatus having an improved composite cable eliminating the need for separately bundled cables, as well as provides an increased service life and reliability of a welding apparatus. Additionally, there is a need in the art for a composite cable that may be easily manipulated by an operator or a robot and has a high resistance to wear and tear, abrasion, and other factors such as external heat and operator abuse.

SUMMARY OF THE INVENTION

A stud welding apparatus includes a power supply and a stud welding tool having a welding head portion and a cable receiving portion. A composite cable having first and second ends is coupled at a first end to the stud welding tool at the cable receiving portion and to the power supply at the second end of the composite cable. The composite cable includes a conductor having no individual electrical isolation and at least one control lead electrically isolated from the conductor. The conductor and the at least one control lead are surrounded by an outer non-conductive layer.

DETAILED DESCRIPTION OF THE PREFERRED EMBODIMENTS

Figure 1A:
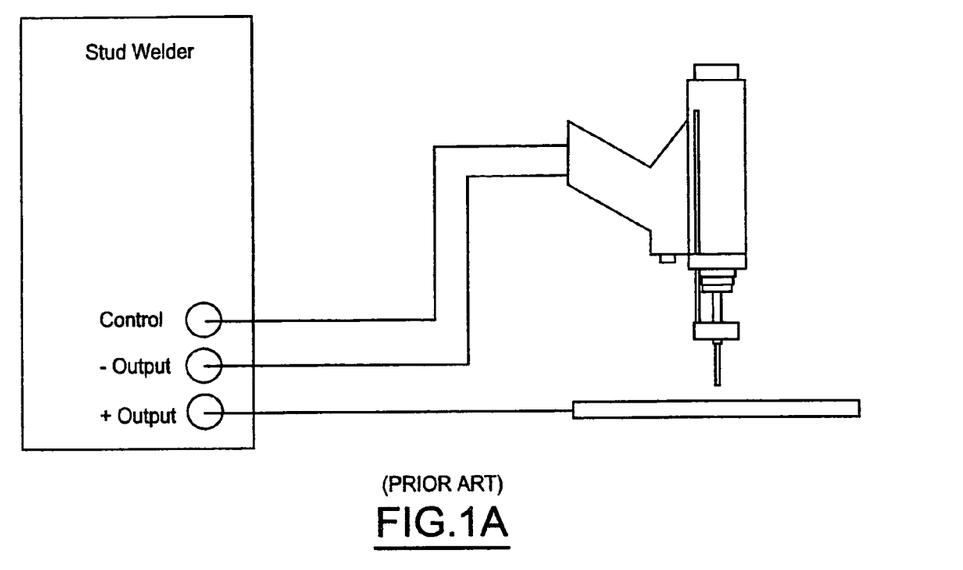
FIG. 1A is a schematic representation of a prior art stud welding apparatus having separate control and power cables.
Figure 1B:
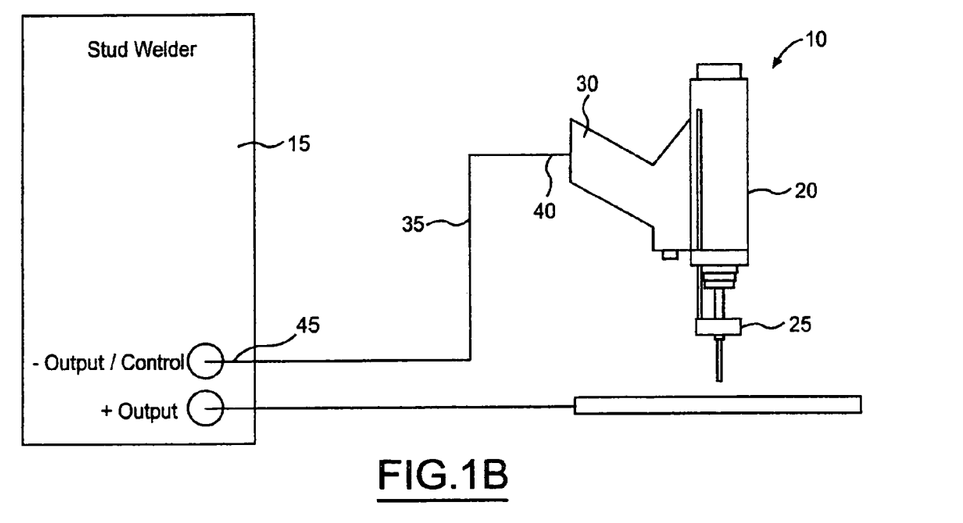
FIG. 1B is a schematic representation of a stud welding apparatus having a composite cable according to the present invention.

Referring to FIG. 1B, there is shown a stud welding apparatus 10 according to the present invention. A stud welding apparatus 10, as the term is used through out the specification and claims includes any welding apparatus that includes the steps of: placing a part to create a short circuit, drawing an arc between the part and another piece, engaging a weld current to melt the part and the other piece and then plunging the part into the piece to create a weld. The part is not limited to stud shaped parts but rather includes any part such as a bracket, angle piece, boss or any other part capable of being joined by the above operation.

The stud welding apparatus 10 includes a power supply 15 and a stud welding tool 20. The power supply 15 includes appropriate control circuitry for controlling the stud welding tool 20. The stud welding tool 20 includes a welding head portion 25 and a cable receiving portion 30. A composite cable 35 includes first and second ends 40, 45. The first end 40 is coupled to the stud welding tool 20 at the cable receiving portion 30 and the second end or handle 45 is connected to the power supply 15. Strain relief structures may be added on the composite cable 35 at both the first end 40, adjacent to the cable receiving portion 30 and the second end 45 adjacent to the handle 45. As can be seen in FIG. 1B, the composite cable 35 is the sole link between the power supply 15 and the stud welding tool 20. This arrangement can be contrasted with that of the prior art stud welding apparatus shown in FIG. 1A. As can be seen, two cables are coupled to the stud welding tool resulting in the inherent inefficiencies outlined in the background section.

Figure 2:
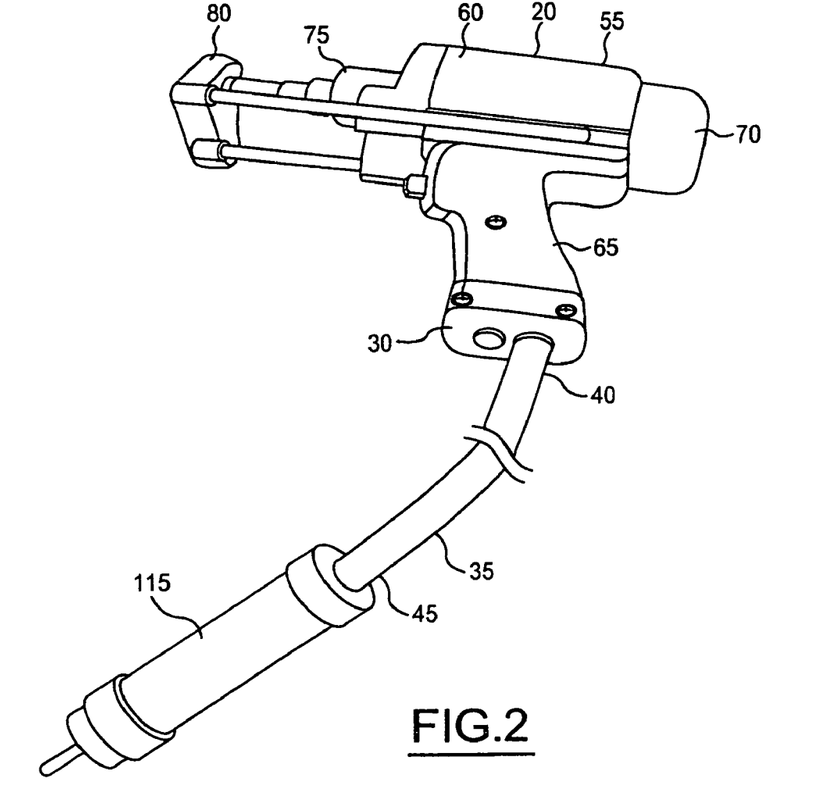
FIG. 2 is a perspective view of a stud welding apparatus including the stud welding tool and the composite cable of the present invention.
Figure 9:
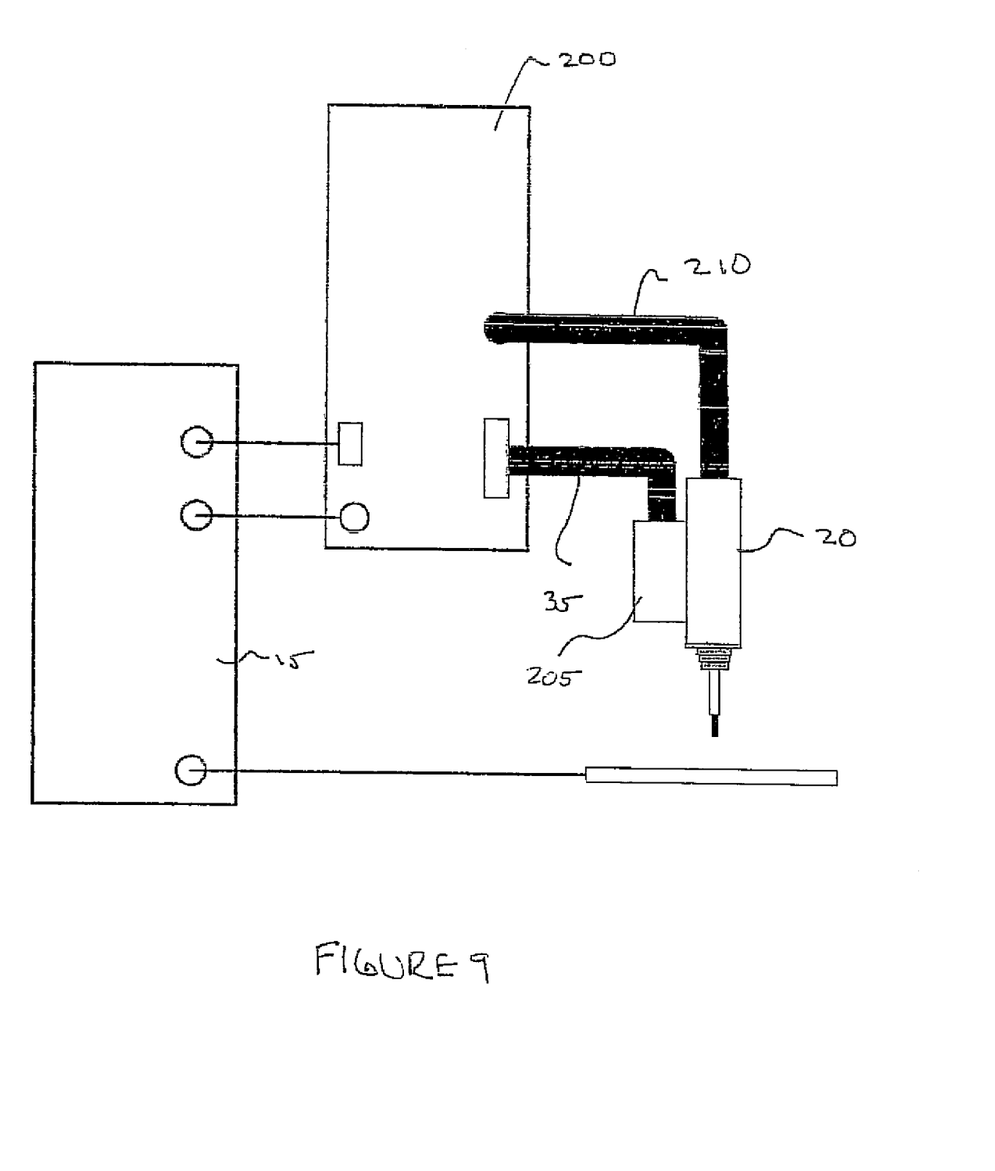
FIG. 9 is a schematic representation of a stud welding apparatus having a stud feeder connected to both the power supply and to an automated motion device welding tool with the composite cable according to the present invention.

Referring now to FIG. 2, there is shown a stud welding tool 20 and composite cable 35 according to one aspect of the invention. As can be seen, the stud welding tool 20 is a handheld stud welding gun 55. The stud welding gun 55 includes a main body or housing 60 of a non-conducting dielectric material. The body 60 includes a pistol grip 65 and a separate rear end cap 70. A chuck 75 is located at the front portion of the tool 20 and holds a stud during a welding operation. The chuck 75 may be surrounded by a spark shield 80 which may be a permanent fixture or may be a ceramic ferrule as is commonly utilized in the art. The chuck 75 in this instance provides the welding head portion 25 while the pistol grip 65 provides the cable receiving portion 30 of the stud welding tool 20. The composite cable 35 is electrically coupled to the stud welding tool 20 at the first end 40 of the composite cable 35. The handheld stud welding gun 55 may be of a design such as that disclosed in U.S. Pat. No. 3,809,849 or U.S. Pat. No. 4,594,495 both commonly owned by the assignee of the present invention and which are herein incorporated by reference. Additionally, the stud welding tool 20 of the present invention may include a stud feeder 200 which may be connected to a handheld stud welding tool or it may be connected to an automated motion control device or robot 205, as shown in FIG. 9. As can be seen in FIG. 9, the stud feeder 200 is connected to the power supply 15. A stud feeding tube 210 and the composite cable 35 of the present invention are connected to the stud feeder 200 at one end and to the stud welding tool 20 at the other.

Referring to FIGS. 5A, 5B, 5C and 5D, there are shown cross sections of the composite cable 35 according to the present invention.

Figure 5A:
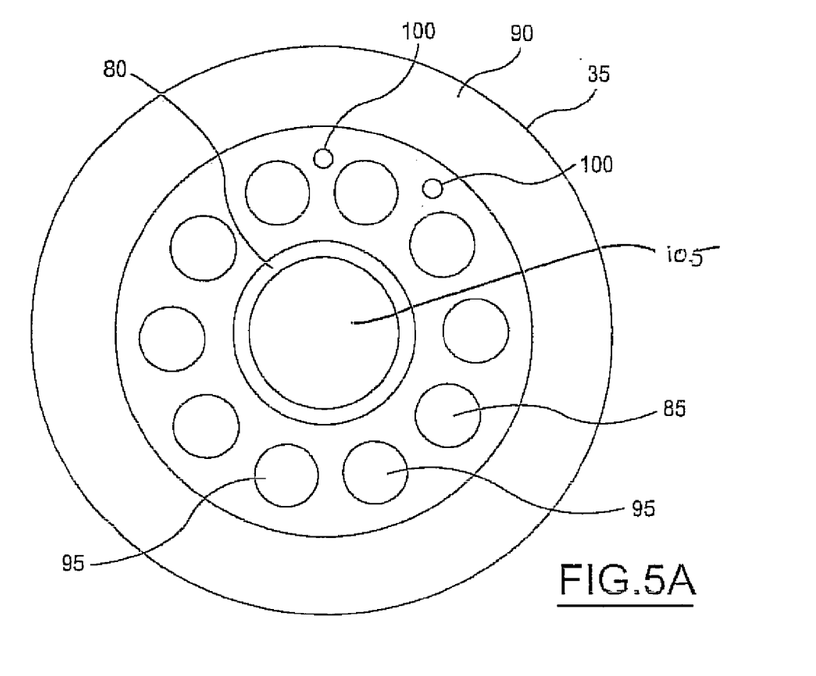
FIG. 5A is a sectional view taken through the composite cable detailing the conduit surrounded by a conductor and the conductor surrounded by an outer nonconductive layer and the control leads disposed within the nonconductive layer.
Figure 5B:
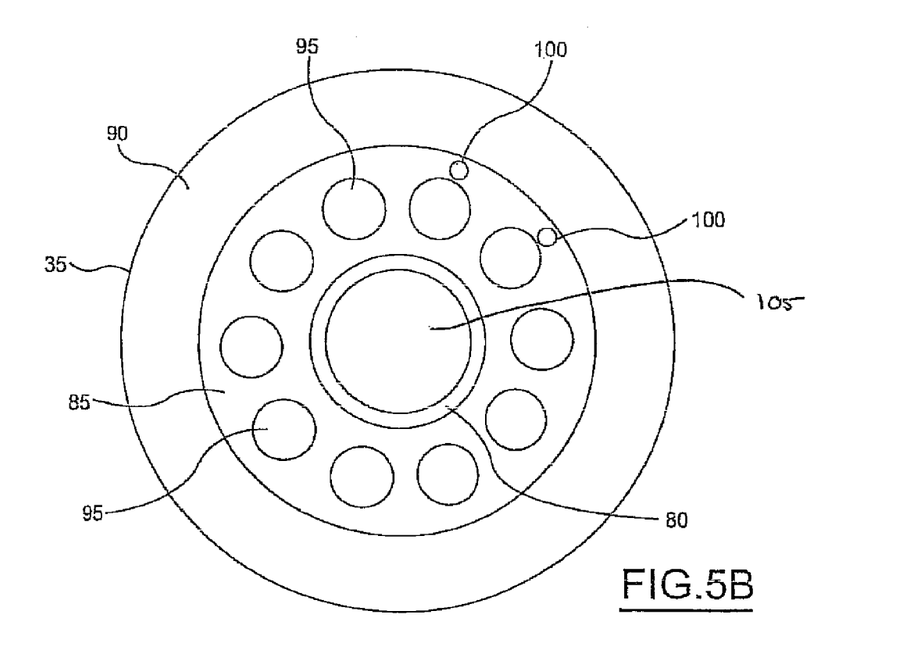
FIG. 5B is a sectional view taken through the composite cable detailing the conduit surrounded by a conductor and the conductor surrounded by an outer nonconductive layer and the control leads disposed between the conductive and nonconductive layer.
Figure 5C:
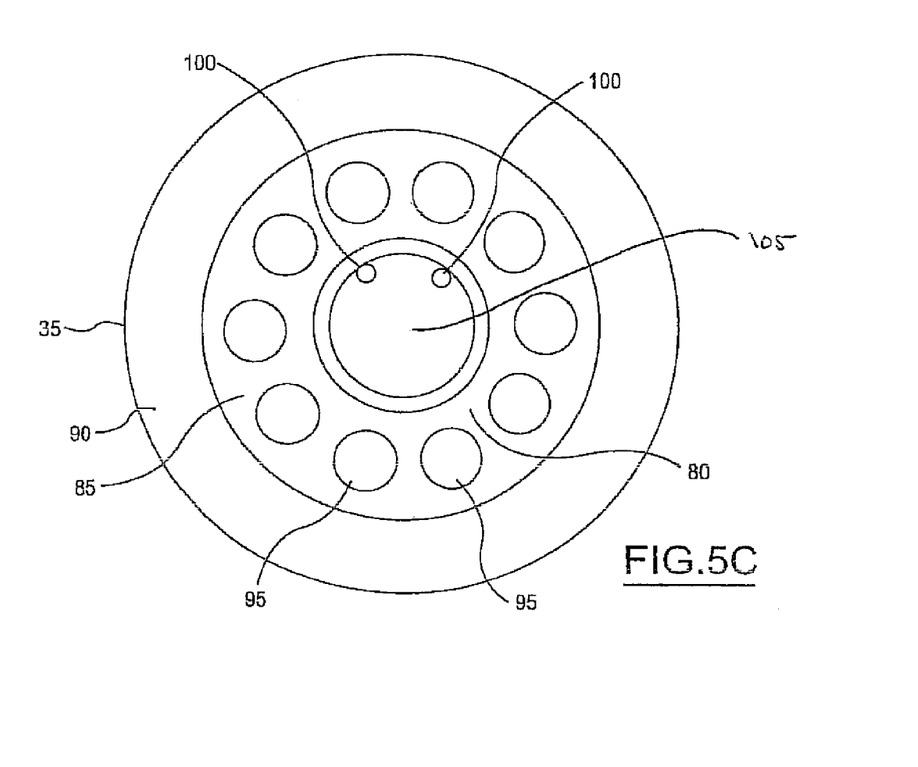
FIG. 5C is a sectional view taken through the composite cable detailing the conduit surrounded by a conductor and the conductor surrounded by an outer nonconductive layer and the control leads disposed within the conduit.
Figure 5D:
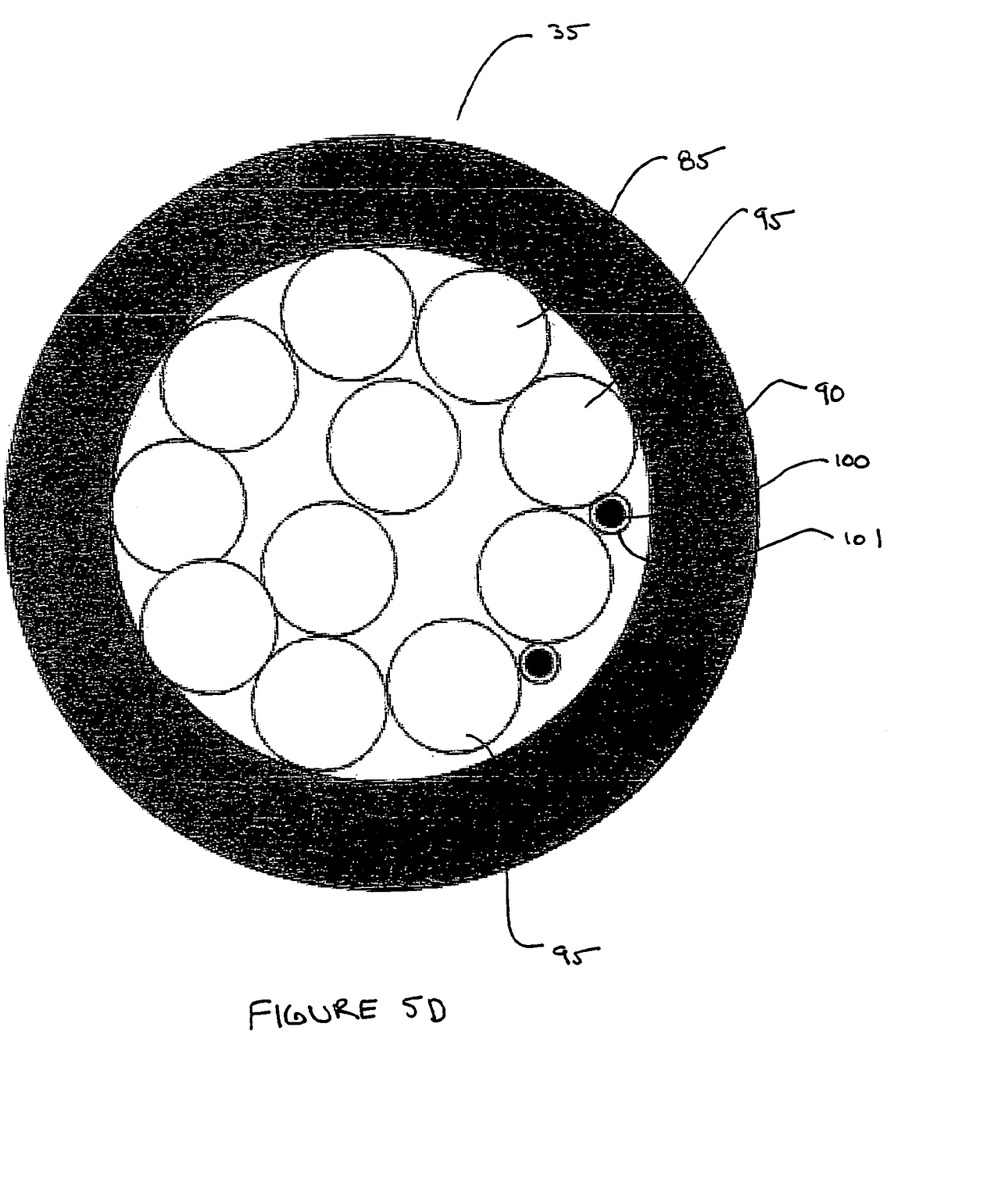
FIG. 5D is a sectional view taken through the composite cable detailing the conductor and the isolated control leads surrounded by an outer nonconductive layer.

Referring to FIG. 5D, the composite cable 35 includes a conductor 85 made of a plurality of conducting strands 95 that do not include individual non-conducting covers, but rather are covered with an outer non-conductive layer 90. The outer non-conductive layer 90 is formed of a suitable polymer and may be a polymer having long, cross-linked molecular chains to add strength, heat-resistance and flexibility to the outer non-conductive layer 90. An example of a suitable polymer includes polyethylene. Additionally, the outer non-conductive layer 90 may include appropriate additives such as, processing additives and flame retardants. In one aspect of the invention the outer non-conductive layer has a shore durometer hardness of from 70-90 Shore A. This range of hardness allows the composite cable 35 to remain flexible while still maintaining a high durability. In another aspect of the present invention, the outer non-conductive layer 90 has a color other than black with color additives.

Referring to FIGS. 5A-5C, the composite cable 35 includes a conduit 80 surrounded by the conductor 85. The conductor 85 is in turn surrounded by an outer nonconductive layer 90. The conductor 85 includes a plurality of copper strands 95, as outlined above that do not include individual non-conducting covers. The conductor 85 is utilized to conduct the weld current from the power supply 15 to the stud welding tool 20.

Additionally, it can be seen in FIGS. 5A-5D that the composite cable 35 includes at least one control lead 100 disposed within the outer nonconductive layer 90. The at least one control lead 100 includes a outer polymer layer 101 that isolates it from the conductor 85. The polymer layer 101 can also be cross linked. In one aspect of the present invention, the at least one control lead is helically would, allowing it to stretch and move without breaking when the composite cable is bent or twisted repeatedly. The helical winding may have a pitch varying from 5 to 15 inches.

FIGS. 5A-5C detail two control leads 100 to trigger or initiate the sequence of a stud welding process. In one aspect of the invention, from one to thirty control leads 100 are disposed within the outer nonconductive layer 90. Various numbers of control leads 100 can be used with various designs such that a variety of control functions may be performed. Various control leads 100 such as a weld switch lead, gun coil solenoid power lead, stud angularity detection lead, servo motor control lead, encoder feedback and power supply leads, weld current adjustment lead, weld time adjustment lead, weld schedule preset control lead, weld quality detection lead, arc voltage sensor lead, force transducer lead, acoustic sensor lead, stud or bracket gripper valve control lead, proximity switch sensor lead, and marking paint ejection control lead may be utilized by the present invention. Various numbers of control leads 100 may be included based on the welding requirements for an operation, as well as the specific design of welding tool 20 utilized by the welding apparatus 10 of the present invention. Additionally, in one aspect of the invention, the at least one control lead 100 may be a fiber optic cable, for example to direct a laser beam for stud aiming purposes or for optical signal transmission to reduce electromagnetic or radio frequency noise susceptibility. Furthermore, in another aspect of the invention, the at least one control lead 100 may be a coaxial cable.

Figure 8:
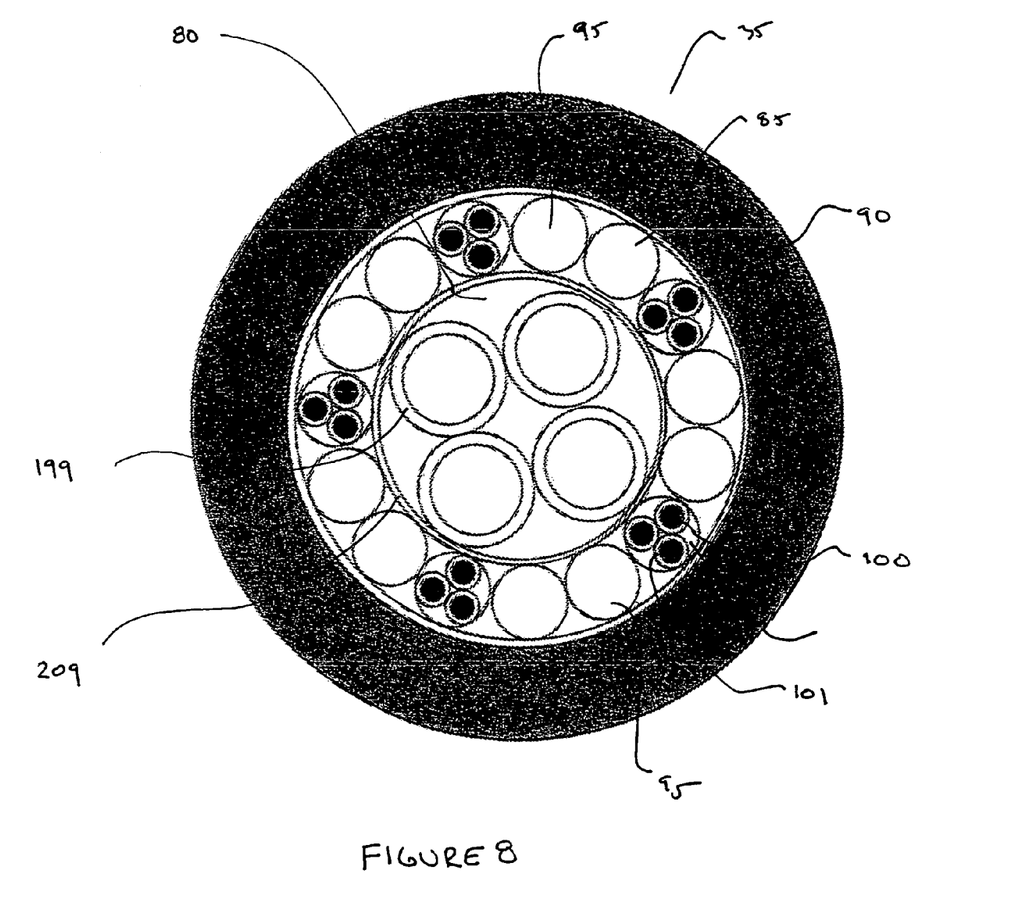
FIG. 8 is a sectional view taken through a composite cable detailing pneumatic lines and shielding gas tube disposed in the conduit and surrounded by a conductor with isolated helically wound control leads all of which are surrounded by an outer nonconductive layer.

The at least one control lead 100 may be disposed within various portions of the composite cable 35. The at least one control lead 100 may be disposed within the conductor 85, as shown in FIG. 5A. In this aspect, the at least one control lead 100 would include an outer jacket or protective coating electrically isolating the control lead 100 from the conductor 85. In another aspect, the at least one control lead 100 may be disposed within the conduit 80, as shown in FIG. 5C. Again, the control lead 100 may be electrically isolated from the conduit 80 by an outer coating or in the case where the conduit 80 is formed of a nonconductive material; the control lead 100 need not be electrically isolated. Additionally, the at least one control lead 100 may be disposed on an outside of the conductor 85 between the conductor 85 and the outer nonconductive layer 90, as shown in FIG. 5B. For example, the control lead 100 may be positioned on an outside of a plurality of copper strands 95, again with the control lead 100 electrically isolated from the strands 95 of the conductor 85. Additionally, the control leads 100 may be bundled in groups, as shown in FIG. 8. For transmitting high frequency signals, the control leads 100 within each group can be twisted together and the group can be shielded by a conductive foil or braid and then covered in a polymer jacket. The groups can be bundled using a wrap or layer 102 to place the control leads in a suitable orientation and position.

Figure 6:
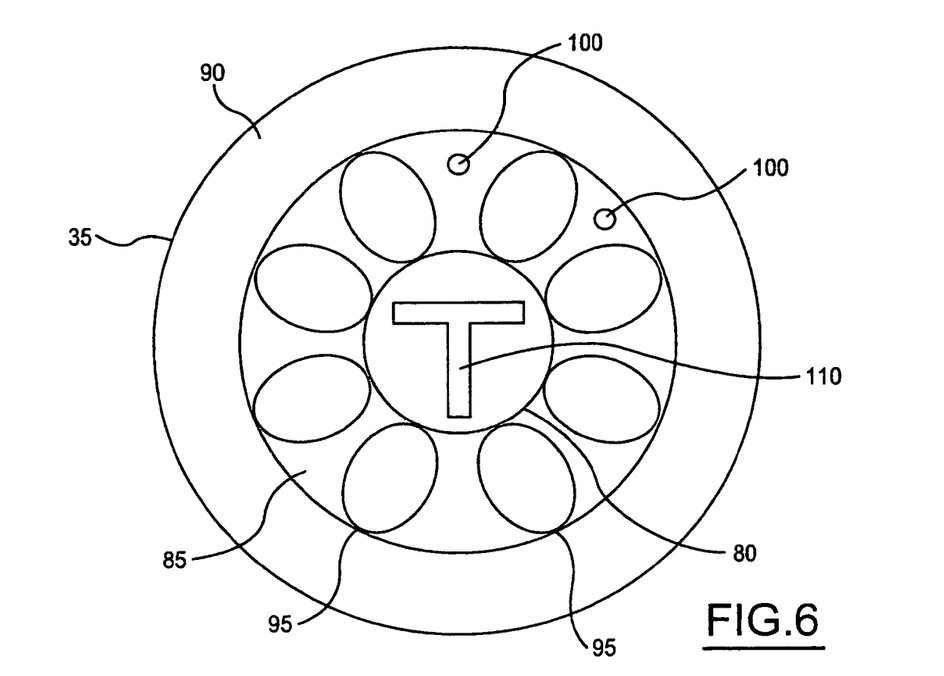
FIG. 6 is a sectional view taken through a composite cable detailing a stud feeding tube surrounded by a conductor which in turn is surrounded by an outer nonconductive layer.

The conduit 80 of the composite cable 35 as shown in FIGS. 5A, 5B, and 5C, has a circular profile, with a centrally formed passage 105. It should be realized that other shapes and configurations such as square, rectangular, oval, and other polygonal shapes, flat ribbon or belt shape, as well as specific shapes designed for various flow characteristics may be utilized by the present invention. Additionally, the conduit 80 may include a specific shaped profile for use as a stud feed conduit, as shown in FIG. 6. The conduit may also be used to house pneumatic lines and shielding gas line, or air lines 199, as shown in FIG. 8 for controlling pneumatically actuated mechanisms, and to cool the electronics of various portions of the stud welding apparatus 20 in FIG. 9. In FIG. 8, the conduit 80 is defined by a low friction sleeve 209 with air lines 199 disposed inside. The air lines may be formed of a suitable material with proper wall thickness to withstand pressure, such as polyester tubing.

The conduit 80 may be utilized for a number of different functions such as a shielding gas conduit, providing inert gas to a welding operation, or an exhaust conduit, wherein fumes from a welding operation may be captured at source and removed from the operator area. Additionally, the conduit 80 may be utilized as a weld stud feed conduit and pneumatic line conduit, as outlined above.

Referring to FIG. 6, when the conduit 80 is utilized as a weld feed conduit it includes a stud shaped inner profile 110 for guiding the weld stud along the conduit 80. In this aspect of the invention, the weld studs may be moved through the use of pressurized air along the shaped inner profile 110 of the conduit 80 into the stud welding tool 20 which may be actuated via one of the control leads 100 to load the stud into the stud welding tool 20 when a welding operation is performed.

Figure 3:
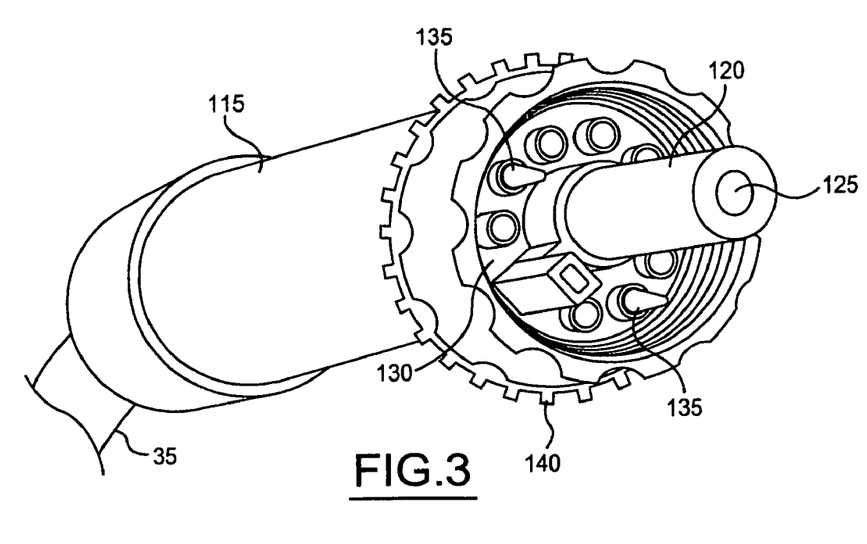
FIG. 3 is a perspective view of an attachment handle at a second end of the composite cable.
Figure 7:
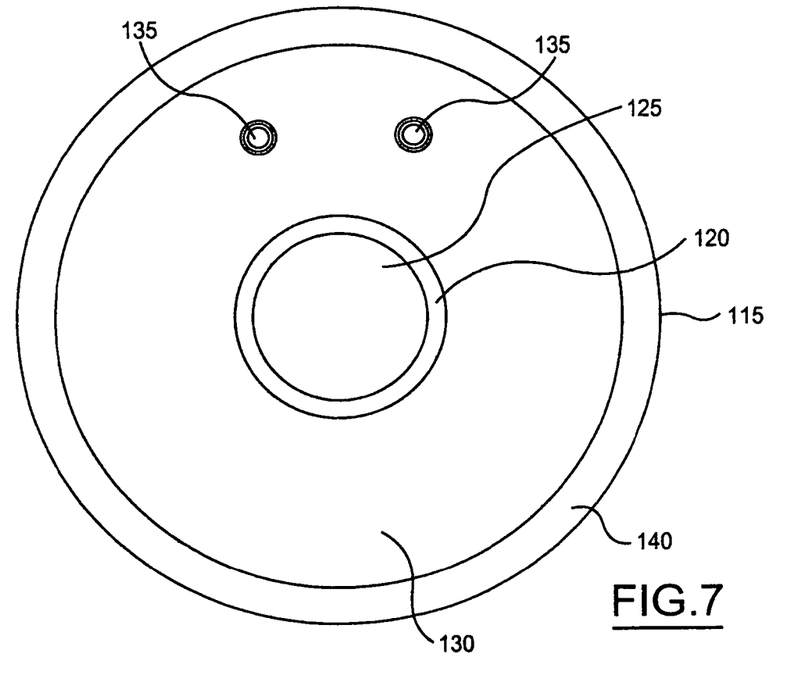
FIG. 7 is a sectional view taken through the handle attachment at the second end of the composite cable.

Referring now to FIGS. 3, and 7, there is shown the second end 45 of the composite cable 35 including an attachment handle 115 for connecting the composite cable 35 to the power supply 15. The attachment handle 115 includes a central pin 120. The central pin 120 is conductive, for transmitting current from the power supply 15 to the stud welding tool 20. The central pin 120 may include a longitudinal bore 125 formed therein for allowing the passage of shielding gas or exhaust fumes through the conduit 80. Additionally, the central pin 120 acts as a locator to position the attachment handle 115 properly when connecting with the power supply 15. The attachment handle 115 also includes an electrically non-conductive member 130, best seen in FIG. 7, for structural support of control pins 135. The control pins are disposed radially outboard of the central pin 120. The control pins 135 are adapted to couple with the control leads 100 of the composite cable 35. The structural member 130 is surrounded by an electrically non-conductive locking nut 140.

Figure 4:
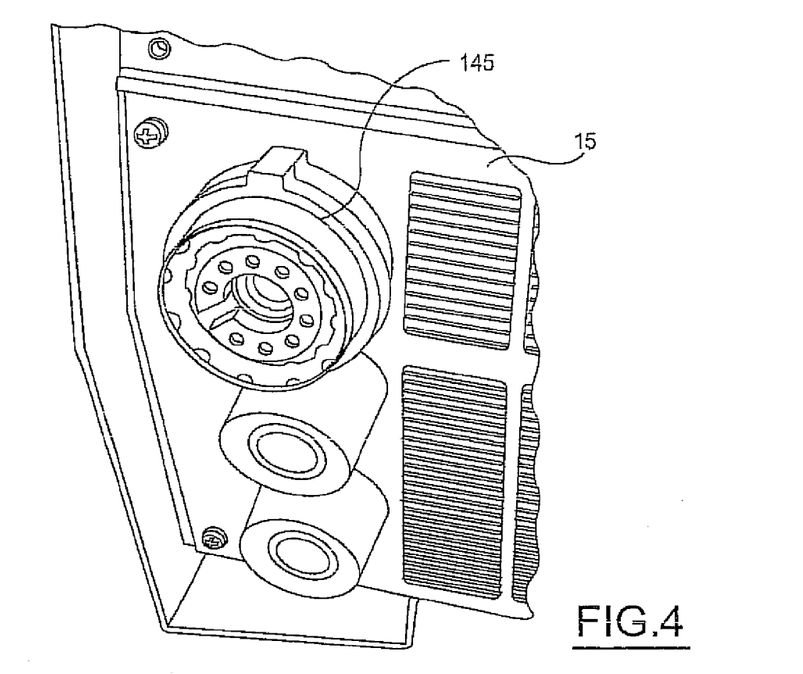
FIG. 4 is a partial perspective view of a power supply according to the present invention.

Referring to FIG. 4, it can be seen that the power supply 15 includes a connection 145 adapted to engage the electrically nonconductive locking nut 140 of the attachment handle 115. The connection 145 on the power supply 15 is a female type receptacle that receives the male portion or central pin 120 of the attachment handle 115. Additionally, the coupling of the connection 145 on the power supply 15 with the nonconductive locking nut 140 may be airtight, when the conduit 80 is utilized for the passage of an inert gas or the removal of exhaust fumes.

In another aspect of the present invention, the composite cable 35 may further include an extension cable 150. The extension cable 150 is designed and adapted to connect to the second end 45 of the composite cable 35 at one end and to the power supply 15 at the other end. Specifically, the extension cable 150 may include the composite cable 35 as described above and shown in figures 2, 3, 5A-D, 6, and 8 and the attachment handle 115 as shown in figures 3 and 7 at one end of the extension cable 150 and the female type connection 145 as shown in figure 4 at the other end of the extension cable 150. The extension cable 150 allows for a lengthening of the composite cable 35 of the present invention in a simple manner. For example, if a welding operation needs to be performed at a location further away from a fixed power supply, the extension cable 150 may be added to the composite cable 35 attached to the stud welding tool 20 to easily allow use of the stud welding apparatus 10 at another location.

In one aspect of the present invention, the composite cable 35, as well as, the extension cable 150, as described above, are preferably cross linked using an electron beam prior to connection with the stud welding tool 20 and power supply 15 or stud feeder 200. Specifically, the cross linking operation exposes the composite cable 35 to electron beams or x-rays such that the composite cable 35 is flexible and easily manipulated by an operator. The cross linking operation preferably includes twisting the cable through 360 degrees of rotation along the length of the cable while subjecting the cable to the electron beam or x-rays. In this manner, the composite cable 35 of the present invention includes a nonconductive and heat-resistant wear-resistant outer layer 90, as well as a flexible conductor 85 that shields or protects a conduit 80. Additionally, the composite cable 35 of the present invention overcomes those deficiencies of the prior art to provide a wear and heat resistant outer nonconductive layer 90 that is also flame resistant and has a long service life. The outer nonconductive layer 90 and conductor 85 remain flexible to allow easy manipulation by an operator, and resist fatigue. Additionally, the helically wound control leads 100 will stretch and move as the composite cable 35 is moved preventing breaking of the control leads 100.

The invention has been described in an illustrative manner. It is described in the context of feeding the stud manually. When the stud is fed automatically by a feeder, the same discussion applies when the power supply 15 in FIG. 1B, 4 and 9 is substituted by the stud feeder 200 in FIG. 9. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A stud welding apparatus comprising:
   a power supply;
   a stud welding tool including a welding head portion and a cable receiving portion;
   a composite cable having first and second ends, the first end coupled to the stud welding tool at the cable receiving portion, the second end connected to the power supply;
   the composite cable including a single weld current conductor having no individual electrical isolation and at least one control lead electrically isolated from the conductor, the conductor and at least one control lead surrounded by an outer nonconductive layer.

2. The stud welding apparatus of claim 1 wherein the composite cable is extruded.

3. The stud welding apparatus of claim 1 wherein the composite cable includes a strain relief structure formed on the first and second ends of the composite cable.

4. The stud welding apparatus of claim 1 wherein the outer nonconductive layer comprises a polymer having cross-linked long molecular chains.

5. The stud welding apparatus of claim 1 wherein the at least one control lead is helically wound.

6. The stud welding apparatus of claim 5 wherein the at least one helically wound control lead has a pitch of from 5 to 15 inches.

7. The stud welding tool of claim 1 wherein the outer non-conductive layer has a durometer hardness of 70 to 90 Shore A.

8. The stud welding tool of claim 1 wherein the outer non-conductive layer has a non-black color.

9. The stud welding apparatus of claim 1 wherein the composite cable includes a conduit surrounded by the conductor.

10. The stud welding apparatus of claim 9 wherein the conduit is selected from the group consisting of: a shielding gas conduit, a welding fume exhaust conduit, a fastener feed conduit, and a pneumatic tube conduit.

11. The stud welding apparatus of claim 10 wherein the fastener feed conduit includes an inner stud-shaped hollow profile for feeding the fastener.

12. The stud welding apparatus of claim 1 wherein the composite cable includes from one to thirty control leads disposed within the outer nonconductive layer.

13. The stud welding apparatus of claim 1 wherein the at least one control lead is disposed within the conductor.

14. The stud welding apparatus of claim 1 wherein the at least one control lead is disposed within the conduit.

15. The stud welding apparatus of claim 1 wherein the at least one control lead is disposed between the conductor and the outer nonconductive layer.

16. The stud welding apparatus of claim 1 wherein the at least one control lead is a lead selected from the group consisting of: trigger weld start lead, solenoid power lead, stud angularity detection lead, servo motor control lead, encoder feedback and power supply leads, weld current adjustment lead, weld time adjustment lead, welding preset control lead, weld quality detection lead, arc voltage sensor lead, force transducer lead, acoustic signal lead, stud gripper valve control lead, low voltage power supply lead, proximity switch control lead, marking paint ejection control lead, coaxial cable and a fiber optic cable.

17. The stud welding apparatus of claim 1 wherein the second end of the composite cable includes an attachment handle for connecting the composite cable to the power supply.

18. The stud welding apparatus of claim 17 wherein the attachment handle includes a central pin that is electrically conductive, at least one control pin electrically isolated from the conductive layer, and an electrically nonconductive locking nut.

19. The stud welding apparatus of claim 18 wherein the power supply includes a connection adapted to engage the electrically nonconductive locking nut of the attachment handle.

20. The stud welding apparatus of claim 18 wherein the central pin includes a longitudinal bore formed therein.

21. The stud welding apparatus of claim 1 wherein the composite cable is cross linked using electron beam irradiation prior to connection with the stud welding tool and power supply.

22. The stud welding apparatus of claim 1 wherein the welding tool is a handheld stud welding gun.

23. The stud welding apparatus of claim 1 wherein the welding tool is a stud welding head manipulated by an automated motion control device.

24. The stud welding apparatus of claim 1 wherein the composite cable further includes an extension cable, the extension cable adapted to connect to the second end of the composite cable at one end and to the power supply at the other end.

25. A stud welding apparatus comprising:
a power supply;
a stud feeder connected to the power supply;
a stud welding tool including a welding head portion and a cable receiving portion;
a composite cable having first and second ends, the first end coupled to the stud welding tool at the cable receiving portion, the second end connected to the stud feeder;
the composite cable including a conduit surrounded by a single weld current conductor, the conductor having no individual electrical isolation and at least one control lead electrically isolated from the conductor, the conductor and at least one control lead surrounded by an outer nonconductive layer.

26. A stud welding apparatus comprising:
a power supply;
a stud welding tool including a welding head portion and a cable receiving portion;
a composite cable having first and second ends, the first end coupled to the stud welding tool at the cable receiving portion, the second end connected to the power supply;
the composite cable including a conduit surrounded by a single weld current conductor, the conductor having no individual electrical isolation and at least one control lead electrically isolated from the conductor, the conductor and at least one control lead surrounded by an outer nonconductive layer.

27. A stud welding cable comprising:
a composite cable having first and second ends, the first end adapted to engage a stud welding tool, the second end adapted to engage a power supply, the composite cable including a single weld current conductor having no individual electrical isolation and at least one control lead electrically isolated from the conductor, the conductor and at least one control lead surrounded by an outer nonconductive layer, the composite cable being cross linked using electron beam irradiation providing environmental protection to the composite cable.

28. A stud welding apparatus comprising:
a power supply;
a stud welding tool including a welding head portion and a cable receiving portion;
a composite cable having first and second ends, the first end coupled to the stud welding tool at the cable receiving portion, the second end connected to the power supply;
the composite cable including a single weld current conductor having no individual electrical isolation and at least one helically wound control lead electrically isolated from the conductor, the conductor and at least one control lead surrounded by an outer nonconductive layer.

* * * * *

UNITED STATES PATENT AND TRADEMARK OFFICE
CERTIFICATE OF CORRECTION

PATENT NO. : 7,511,245 B2 Page 1 of 1
APPLICATION NO. : 11/224513
DATED : March 31, 2009
INVENTOR(S) : Christopher Hsu

It is certified that error appears in the above-identified patent and that said Letters Patent is hereby corrected as shown below:

Column 4, line 6 delete "a" and insert --an--

Column 4, line 9 delete "would" and insert --wound--

Signed and Sealed this

Ninth Day of June, 2009

JOHN DOLL
*Acting Director of the United States Patent and Trademark Office*